United States Patent [19]

Boyd et al.

[11] Patent Number: 4,644,039
[45] Date of Patent: Feb. 17, 1987

[54] BIS-MALEIMIDE RESIN SYSTEMS AND STRUCTURAL COMPOSITES PREPARED THEREFROM

[75] Inventors: Jack D. Boyd, Westminster, Calif.; David A. Shimp, Prospect, Ky.

[73] Assignee: BASF Corporation, Wyandotte, Mich.

[21] Appl. No.: 839,893

[22] Filed: Mar. 14, 1986

[51] Int. Cl.[4] ............................................. C08G 69/48
[52] U.S. Cl. .................................... 525/422; 526/193; 526/262; 528/170; 528/313; 528/322
[58] Field of Search ................ 525/422; 526/193, 262; 528/170, 313, 322

[56] References Cited

U.S. PATENT DOCUMENTS

| 3,929,713 | 12/1975 | D'Alelio | 525/422 |
| 4,012,361 | 3/1977 | Bargain | 525/422 |
| 4,220,741 | 9/1980 | Renner et al. | 525/422 |

Primary Examiner—James J. Bell
Attorney, Agent, or Firm—William G. Conger

[57] ABSTRACT

The use of organophosphines, organophosphonium salts or organophosphine complexes as cure catalysts in the cure of maleimide resin systems produces products having excellent physical properties and improved gel times. These systems are especially useful in the production of advanced structural composites.

16 Claims, No Drawings

BIS-MALEIMIDE RESIN SYSTEMS AND STRUCTURAL COMPOSITES PREPARED THEREFROM

BACKGROUND OF THE INVENTION

1. Field of the Invention

The subject invention relates to structural composites. More particularly, the invention relates to structural composites prepared from maleimide resins cured with organophosphine or organophosphonium catalysts such as triphenylphosphine, or complexes thereof.

2. Description of the Related Art

Advanced composites and adhesives are becoming increasingly important in fabricating structures, especially in the aerospace, transportation and electrical industries. Many of the modern construction techniques utilized in these industries bear little resemblance to those practiced even as recently as a decade ago. Whole aircraft wing structures, for example, may be fabricated by laminating together a variety of woven fibrous materials impregnated with resin. The fibers useful for these purposes run the gamut from simple cotton or dacron to exotic and expensive fibers such as boron, carbon, and graphite.

The resins and adhesives necessary to form the composites and to bond them to each other must possess a variety of sometimes conflicting physical properties. They must form a strong resin-to-fiber bond while having great tensile strength, modulus, and thermal stability. Modern resins are far superior in this respect to the resins previously used in composite construction.

Among the resins commonly used for advanced structural composites are the bis-maleimide resins. These resins may be produced by the reaction of maleic anhydride with a suitable diamine. Suitable diamines, for example, are common aliphatic and aromatic diamines. The production of suitable bis-maleimide monomers is described, for example, in U.S. Pat. Nos. 3,839,358; 3,018,290; 3,018,292; and 3,627,780. The bis-maleimides produced correspond to the formula:

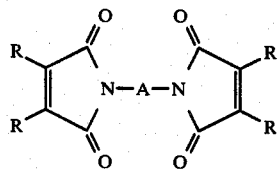

wwherein R is hydrogen, lower alkyl or substituted lower alkyl, and where A is the organic residue derived from the diamine. These bis-maleimides may be the sole monomer in the resin system and may be polymerized through the application of heat alone or in conjunction with suitable catalysts.

Unfortunately, polymerization of bis-maleimides alone results in polymers which, although strong, tend to be brittle. Thus attempts have been made to copolymerize bis-maleimides with other monomers. In U.S. Pat. No. 3,562,223, for example, bis-maleimides are co-polymerized with organic diamines in a bis-maleimide to diamine ratio of from 1.2:1 to 50:1. In U.S. Pat. Nos. 4,518,754 and 4,518,755 the co-polymerization of bis-maleimides and olefinically unsaturated monomers is disclosed. Co-polymerization of bis-maleimides with alkenylphenols or alkenylphenol ethers is disclosed in U.S. Pat. No. 4,100,140, while co-polymerization with N-vinylpyrrolidin-2-one and acrylamide is disclosed in U.S. Pat. No. 4,413,107.

The bis-maleimides may also be in the form of maleimide terminated prepolymers. When such prepolymers are utilized, the prepolymer chain length and type may be selected to provide optimal performance. Long nonpolar prepolymers tend to possess high elongation while shorter, polar prepolymers tend to have greater modulus. A wide variety of such bis-maleimide prepolymers are commercially available.

While most of these resin systems may be polymerized through the application of heat alone, generally catalysts are necessary to achieve optimum performance. Suitable catalysts are the various secondary, tertiary, and quaterary amines as disclosed in U.S. Pat. No. 4,100,140. Examples of these are the various dialkyl and trialkyl amines such as di- and triethylamine. Various peroxy ketals useful in the polymerization of polyimide systems are disclosed in U.S. Pat. No. 4,338,430, and alkali metal salt catalysts, particularly the salts of mono- and dicarboxylic acids are disclosed in U.S. Pat. No. 4,418,181. The use of zinc octoate, dimethylbenzylamine, and 2-ethyl-4-methylimidazole, alone and in combination, is disclosed in U.S. Pat. No. 4,410,601.

However, despite the wide variety of catalysts proposed in the prior art, further improvement is still desirable. The reason why catalysis of the various bis-maleimide resin systems is particularly difficult lies in the manner in which these resins are customarily used. For example, the polyimide systems contemplated by the subject invention are often prepared in the form of films coated or cast on release paper for later use. In these applications, the resin may be deposited from a solution in an organic solvent, as a dispersion, or preferably, as a melt.

The films thus prepared are generally used for the preparation of fiber reinforced prepregs. The bis-maleimide resin film is fed, along with the yarn, tape, or cloth desired to be impregnated, through a system of heated pressure rollers. A single film may be applied to the top or bottom of the yarn, tape or cloth substrate, or two films may be applied, one of the top and one on the bottom. These processes of prepreg formation are well known to those skilled in the art of advanced structural composites.

Instead of preparing a film, an alternative method is to deposit the resin system directly onto the yarn, tape, or cloth. This may be accomplished by the use of solution techniques where the resin is dissolved in a solvent, dispersion techniques where the resin is dispersed in a suitable continuous phase; or directly from the neat resin in the melt. These techniques are often performed at moderately elevated temperatures.

Because the prepregs prepared by these processes contain partially cured systems containing latent or low room temperature activity cure catalysts, they must generally be stored at low temperatures prior to their use in manufacturing composites. Such prepregs often lose their tack and drape characteristics after only a short period of time. Even when carefully stored, their storage life is generally limited. Shelf lives of only several days at room temperature are common. Refrigeration may be useful in extending this time somewhat, but prepregs having extended room temperature shelf life are needed.

If the catalyst utilized if the resin is too active at low temperatures, resin in the prepreg may polymerize during the preparation of the resin or during the prepreg impregnation processes, producing resins and prepregs which are too highly advanced and therefore virtually infusible. These prepreg would not be suitable for their intended use in economically fabricating structural composites. However, if the catalyst is too inactive during cure, excessive curing temperatures may be required in order to prevent long gel times when the prepregs are later assembled and cured into composites.

Composites prepared by laminating resin impregnated yarn, tape, or fabric prepreg are often subjected to a partial cure while in the mold or form used to shape the composite structure followed by a second cure. often at an elevated temperature. The green strength of the partially cured composite is of importance, as composites with higher green strength are handled more easily and are superior with respect to various machining operations often performed at this stage.

SUMMARY OF THE INVENTION

It has now been unexpectedly found that the elevated temperature curing of maleimide resin systems suitable for producing films and prepregs may be effectively catalyzed by the use of organophosphine and organophosphonium type catalysts. These resin systems unexpectedly result in prepregs having outstanding physical properties while maintaining optimal gelation times. Composites formed from prepregs containing the maleimide resins of the subject invention as the matrix resin show improved green strength as compared to resin systems catalyzed with other catalysts. In addition, the prepregs prepared from these resins may maintain their tack and drape for periods in excess of two weeks, even when stored at room temperature.

DESCRIPTION OF THE PREFERRED EMBODIMENTS

The heat curable, catalyzed maleimide resin systems of the subject invention contain one or more organophosphine or organophosphonium catalysts, one or more maleimide group-containing monomers, and preferably, suitable co-monomers. A wide variety of maleimides may be used in the maleimide resin systems of the subject invention, for example those listed in U.S. Pat. Nos. 3,929,713; 3,018,292; 3,018,290; 3,839,358; 3,562,223; 4,518,754; and 4,377,657. Preferably used are the bis-maleimides derived from aromatic diamines such as 4,4'-, 2,4'-, 3,3- and 2,2'-diaminophenylmethane, 2,4- and 2,6-toluenediamine; those derived from aliphatic diamines such as hexamethylenediamine, octamethylenediamine, decamethylenediamine, and dodecamethylenediamine; from cycloaliphatic diamines such as 1,4-cyclohexanediamine, 3,3'- 4,4'-, 2,4'- and 2,2'-dicyclohexylmethanediamines and isophoronediamine and from aliphatic aromatic diamines such as xylylenediamine. Most preferably, eutectic mixtures containing two or more of the bis-maleimides of these diamines are utilized. Other suitable diamines used to prepare bis-maleimides include 4,4'-diaminodiphenyl oxide, 1,3-bis[3-aminophenoxy]benzene, 2,2'-, 2,4'-, 3,3'-, and 4,4'-diaminodiphenyl, 2,2'-, 2,4'-, 3,3'-, and 4,4'-diaminodipnenylsufone, 2,2'-, 2,4'-, 3,3'-, 4,4'-diaminodiphenylsulfide, and 2,2'-, 2,4'-, 3,3'-, and 4,4'-diaminobenzophenone. Additional examples of diamines which are suitable are listed in U.S. Pat. No. 4,418,181.

Also suitable for the practice of the subject invention are the maleimide terminated polyimides such as those disclosed in U.S. Pat. Nos. 3,890,272, 3,929,713, and 4,418,181, and the polyamino bis-maleimides. Especially preferred are the complex polyamino bis-maleimides prepared by reacting 4,4'-diaminodiphenylmethane with the bis-maleimides of 1,12-dodecanediamine and 4,4'-diaminodiphenylmethane.

In addition to the preferred bis-maleimides, mono-maleimides and poly-maleimides may be useful in particular applications. The use of mono-maleimides may result in a resin system which in its cured state is less extensively cross-linked. Such cured systems may be expected to have greater flexibility than similar systems containing only bis- or higher functional maleimides. Poly-maleimides such as tris-, tetrakis-, and higher functional maleimides are also useful in the maleimide resin systems of this invention. Poly-maleimides may be used to increase the cross-link density of the resins, generally resulting in increased strength. Surprisingly, the use of certain poly-maleimides such as those derived from polyphenylene polymethylene polyamines result in matrix resins with improved toughness and high temperature performance in addition to high strength. Examples of suitable poly-maleimides are those produced through the reaction of maleic anhydride with polyphenylenepolymethylene polyamines and other polyamines.

Useful as co-monomers are various unsaturated organic compounds, particularly those having multiple unsaturation. The unsaturation may be ethylenic or acetylenic in nature, and the term unsaturation in this application should be construed to refer to both types of unsaturation. Examples of unsaturated monomers are the various acrylic acids and amides and the esters derived from them, for example acrylic acid, methacrylic acid, methylmethacrylate, acrylamide, methacrylamide, and the like. Also useful in particular applications are maleic anhydride, methylmaleic anhydride, dimethylmaleic anhydride. dicyano-, and tetracyanoethylene, and allyl alcohol.

Preferably used as unsaturated co-monomers are organic compounds having multiple unsaturation. Particularly useful are bis-unsaturated compounds such as the divinyl arylenes disclosed in U.S. Pat. No. 4,377,657 and the alkenylphenols described in U.S. Pat. No. 4,100,140. Other multiply unsaturated co-monomers are 2.2'-diallylbisphenol A, 2,2'-dipropenylbisphenol A, diallylphthalate triallylisocyanurate and triallylcyanurate. Most preferably, the unsaturated co-monomer is 2,2'-diallylbisphenol A.

Catalysts suitable for the preparation of the bis-maleimide resin systems of the subject invention are organophosphine and organophosphonium catalysts. Suitable organophosphine catalysts are the various mono-, di-, and tri- alkyl- or aryl-phosphines and tertiary phosphine oxides, for example methyl-, dimethyl-, and trimethylphosphine, ethyl-, diethyl-, and triethylphosphine, the various propyl-, isopropyl-, and butylphosphines, and especially the higher alkyl phosphines such as tris(n-octyl)phosphine. Also suitable are various mixed alkylarylphosphines, and especially the various mono-, di-, and triarylphosphines. Examples of the latter are mono-, di-, and tri-phenylphosphine, the various tolylphosphines, and xylylyl phosphines. Also useful are the organic and inorganic acid salts of the above-mentioned phosphines, for example triphenylphosphonium chloride and triphenylphosphonium acetate.

As most if not all the organophosphines are toxic, those with higher vapor pressures and higher melting points are preferred. Particularly preferred due to its physical properties and ready availability is triphenylphosphine. Because of their generally high vapor pressures, various organophosphonium compounds such as organophosphonium salts or complexes may also be useful as catalysts. Suitable phosphonium salts include the acetates, bromides, chlorides, hydroxides, and iodides, for example, the tetrabutyl, tetrakis(n-octyl)- and tetraphenylphosphonium acetates, chlorides, bromides, iodides and hydroxides. Particularly preferred are phosphonium salts or complexes which decompose or dissociate to phosphines at cure temperatures. Examples of thermally activatable phosphine precursors may be found in Kosolapoff, *Organic Phosphorus Compounds*, Chapter 4, copyright 1972 by John Wiley & Sons. Examples of phosphonium complexes are the complexes of the previously mentioned tertiary phosphines with quinones or anhydrides for example quinones such as 1,4-benzoquinone. 2,3,5,6-tetrachloro-, 2,3,5,6-tetramethoxy-, and 2,3,5,6-tetracyanobenzoquinone. and 1,4-napthoquinone; and anhydrides such as maleic anhydride and succinic anhydride.

The amount of organophosphine or organophosphonium catalyst or their mixtures may be varied depending upon the desired gel time, or other desirable characteristics like toughness, but generally ranges from about 0.01 percent to 5.0 percent by weight relative to the total resin weight, preferably between 0.05 percent and 1 percent by weight, and most preferably, between 0.1 percent and 0.5 percent by weight. The organophosphine and phosphonium catalysts of the maleimide resin systems of the subject invention are effective in accelerating the high temperature cure and in increasing the toughness of these systems while being virtually inactive at room temperature, and ineffectual during prepreg manufacture.

The maleimide resin systems may be utilized in several ways which are well known to those skilled in the art. In one method, a film of resin, optionally supported by and impregnated in a thin carrier web, is applied to silicone coated release paper by traditional coating methods. The resin may be applied neat from the melt or dissolved in a suitable organic solvent. The thickness of the film may be adjusted from a fraction of a mil to several hundred millimeters thick, depending upon the application.

If a carrier web is utilized, it is generally a thin, fine denier woven material. Suitable carrier webs may be woven from synthetic fibers such as polyimides, polycarboxamides, polyureas, polyurethanes, polybenzimidazoles, and especially polyacrylics, polyamides, and polyesters. Natural fibers such as cotton or linen may also be used, but are not preferred. Fiber mats of these materials are also useful.

The maleimide resin film thus prepared may be used as an adhesive. In this application, the release paper is stripped off and the film applied between the surfaces to be adhered. The joint is then heated for a sufficient time, generally under pressure, to melt and then cure the resin. The resin normally gels in from 5-6 minutes at 350° F. (177° C.). A post cure at temperatures of from 150° F. (66° C.) to 550° F. (288° C.) may be desirable to produce optimum properties.

Preferably, however, the maleimide resin system is utilized in manufacturing fiber-reinforced prepregs destined for assembly into structural composites. In this application, the maleimide film previously prepared is fed concurrently with fiber strands, mat, tape, yarn, or cloth through a series of heated pressure rollers. These rollers are maintained generally at temperatures of from 50° F. (10° C.) to 500° F. (260° C.), more preferably from 200° F. (93° C.) to 300° F. (149° C.), and most preferably, from 230° F. (110° C.) to 300° F. (149° C.). The temperature and pressure of the rollers used to prepare fiber-reinforced prepregs will, of course, vary with the nature of the fiber reinforcement and the nature and amount of resin applied. Adjustments such as these are routinely made by those skilled in the art. Further description of prepreg manufacture using matrix resin films is found, for example, in U.S. Pat. No. 3,784,433. Generally the prepregs must traverse several sets of rollers to somewhat "work" the resin into the fibers in order that the fibers be partially "wet" with resin.

In addition to the use of maleimide resin films to produce prepregs, the prepreg substrate may be impregnated by other methods. For example the fiber yarn, tape, or fabric may be drawn through a dip talk containing a solution of the maleimide in a suitable solvent or a dispersion of the maleimide in a suitable continuous phase, or the neat maleimide resin system may be applied in the melt directly to the prepreg substrate.

When applied as a solution or dispersion, the yarn, tape, mat or fabric is drawn through a tank or trough containing a solution or dispersion of the maleimide resin, following which the solvent or continuous phase, as the case may be, is evaporated. The process may be repeated where larger quantities of resin are desired. Suitable organic solvents are methylethylketone, acetone, dimethylformamide, dimethylacetamide, N-methylpyrrolidone, chloroform, and tetrahydrofuran, for example. When it is desired to apply dispersions, generally polar solvents are used, such as water, methanol, ethanol, or isopropanol. The maleimide resins may also be applied in powdered form, although at present this technique is not practiced extensively. Resin can also be applied as a "thick film" to three dimensionally woven fabrics or fabrics consisting of plies sewn together to improve toughness. In this infusion technique the resin flows into mats up to one inch thick or more.

To form structural composites. conventional production methods well known to those skilled in the art are used. For manufacturing gross structures, laminating presses, vacuum and pressure bag molding, and autoclave techniques are routinely practiced. In these processes, a "sandwich" containing several layers is prepared. The layers may be the same or different. They may contain the same type of fiber reinforcement, e.g., graphite fibers, or some layers may be graphite and others carbon, glass fiber, boron, or organic, e.g. aromatic polyamides or aramids such as Kevlar ®, and polyester fibers such as Dacron ®, etc. The resins utilized in each prepreg layer may also be the same or different. The fiber reinforcements may be woven (random or bi-directional) or oriented (unidirectional) as the particular stresses require. Furthermore, the orientations of each prepreg layer may be varied. In this manner, composites having a wide variety of physical, chemical, and thermal properties may be produced.

Once the "sandwich" or "composite" is assembled, it is placed in a suitable mold and heated to cure the resin. During cure, the resin in the prepregs flows together forming a unified solid structural composite. At cure temperatures, the resin forms many chemical crosslinks, transforming what was a thermoplastic material at lower temperature to a highly crosslinked thermosetting solid. The cure stage often causes great difficulty in composite manufacture from prepregs.

If the resin has too long a gel time, the liquid resin may 37 bleed" excessively from the composite in the heated mold. In extreme cases, the mold must be lined with "bleed cloth" to absorb the resin. Bleeding not only causes a loss of expensive resin, but may cause manufacturing problems. The most advantageous gel times are in the range of approximately 5–20 minutes at the designated cure temperature. Gel times throughout this range are useful depending on the application. Even shorter gel times than 5 minutes are useful in certain electrical applications such as encapsulation.

The composites may also be formed by laminating tape prepregs, or by winding tape or yarn prepregs. The same considerations as previously mentioned apply to these techniques as well. These composites find increasing use in aerospace structures, and in various automotive endeavors as well.

The following examples illustrate the formulation and use of the bis-maleimide resin systems of the subject invention, but do not serve to limit the scope of the invention in any way.

EXAMPLE 1

A maleimide resin system within the scope of the subject invention was prepared. To 54 parts by weight of the bis-maleimide of 4,4'-diaminodiphenylmethane was added approximately 46 parts by weight of 2,2'-diallylbisphenol A. The mixture stirred at a temperature of 250° F. (138° C.) until homogenous. After the mixture had cooled, 0.3 part by weight triphenylphosphine catalyst dissolved in 2,2'-diallylbisphenol A was added and the mixture stirred until homogenous. The amount of 2,2'-diallylbisphenol A added initially was adjusted such that the total 2,2'-diallylbisphenol A content was 46 parts by weight.

COMPARATIVE EXAMPLE A

A maleimide resin was prepared as in Example 1, but with no catalyst.

COMPARATIVE EXAMPLE B

A maleimide resin was prepared as in Example 1 but 0.3 part by weight DABCO®, diazabicyclo[2.2.2]octane, a tertiary amine catalyst was utilized.

COMPARATIVE EXAMPLE C

A maleimide resin was prepared as in Example 1, but 0.3 part by weight of benzyldimethylamine was utilized as the catalyst.

Table I below summarizes the effects of the catalyst of the physical properties of composites prepared from the various resin systems. The composites were prepared by laminating six layers of Union Carbide T-300 carbon fiber fabric impregnated with 32 %2 percent by weight of maleimide matrix resin. Impregnation was accomplished by passing the T-300 fabric and a release paper coated film of maleimide resin between heated rollers maintained at 250° F., (121° C.). Initial cure of the composite was effected at a temperature of 350° F., (177° C.), followed by a final cure at 475° F., (246° C.) for four hours. Short beam shear was measured by ASTM method D2344 at room temperature.

Table I shows that the organophosphine cured systems (Example 1) exhibited shorter gel times while maintaining short beam shear strength. The shear strength was higher than both conventionally catalyzed and noncatalyzed systems. In addition, the triphenyl phosphine catalyzed prepregs maintained their tack and drape even after two weeks storage at room temperature.

TABLE I

| Example | 1 | A | B | C |
|---|---|---|---|---|
| Matrix Resin Monomer Components | | | | |
| Bis S[1] | 54 | 54 | 54 | 54 |
| Diallyl bisphenol A | 46 | 46 | 46 | 46 |
| Catalyst | | | | |
| Triphenylphosphine | 0.3 | — | — | — |
| DABCO ®[2] | — | — | 0.3 | — |
| Benzyldimethylamine | — | — | — | 0.3 |
| Properties | | | | |
| Gel Time (min) @ 350° F. | 5–6 | >20 | >20 | >20 |
| Short Beam Shear (ksi) | 12.6 | 11.9 | 10.6 | 12.4 |

[1]Bis S is the bis-maleimide of 4,4'-diaminodiphenylmethane.
[2]DABCO ® is diazabicyclo[2.2.2]octane.

EXAMPLE 2

A maleimide resin within the scope of the subject invention was prepared as in Example 1 but with 57 parts by weight of the bis-maleimide of 4,4'-diaminodiphenylmethane, 42.8 parts 2,2'-diallylbisphenol A and 0.2 part triphenylphosphine.

COMPARATIVE EXAMPLE D

A maleimide resin was prepared as in Example 2 but no catalyst was added.

The heat distortion temperatures of wet and dry cast films of resin corresponding to Example 2 and Comparative Example D were measured according to ASTM test method D1637. The results of these tests are presented in Table II. As can be seen, the phosphine cured resin had appreciably enhanced heat distortion characteristics in the wet condition.

TABLE II

| Resin | Heat Distortion Temperature (Dry) | Heat Distortion Temperature (Wet) |
|---|---|---|
| Example 2 | >255° C. | 230° C. |
| Comparative Example D | 255° C. | 200° C. |

The embodiments of the invention in which an exclusive property or privilege is claimed are defined as follows:

1. A heat curable maleimide resin system comprising (a) a maleimide resin and (b) an amount of a catalyst selected from the group consisting of organophosphines, organophosphonium salts, or complexes thereof effective to accelerate the elevated temperature cure of said resin system.

2. The resin system of claim 1 wherein said catalyst is present in an amount of from 0.01 percent to about 5.0 percent by weight relative to the total resin system.

3. The resin system of claim 1 wherein said catalyst is present in an amount of from 0.05 percent to about 1.0 percent by weight relative to the total resin system.

4. The resin system of claim 1 wherein said maleimide is a bis-maleimide.

5. The resin system of claim 1, wherein said maleimide comprises a polyamino bis-maleimide prepared by reacting a bis-maleimide with one or more diamines.

6. The resin system of claim 5 wherein said diamine is selected from the group consisting of cyclohexanediamine, hexanediamine, phenylenediamine, toluenediamine, diaminodiphenylmethane, xylylenediamine, isophoronediamine, dodecanediamine, diaminodiphenyloxide, diaminodiphenylsulfide, and 3,3'- 4,4'-diaminodiphenylsulfone.

7. The resin system of claim 1, further comprising (c) an unsaturated co-monomer.

8. The resin system of claim 7 wherein said unsaturated co-monomer is a multiply unsaturated co-monomer.

9. The resin system of claim 8 wherein said multiply unsaturated co-monomer is a bis-unsaturated co-monomer selected from the group consisting of diallylphthalate, 2,2'-diallylbisphenol A, and 2,2'-dipropenylbisphenol A.

10. The resin system of claim 1, further comprising (c) an unsaturated co-monomer and (d) a diamine co-monomer.

11. The resin system of claim 10 wherein said diamine is selected from the group consisting of cyclohexanediamine, hexanediamine, phenylenediamine, toluenediamine, diaminodiphenylmethane, xylylenediamine, isophoronediamine, dodecanediamine, diaminophenylsulfide, diaminodiphenylsulfone and diaminodiphenyloxide.

12. The resin system of claim 10 wherein said unsaturated co-monomer is a bis-unsaturated co-monomer.

13. The resin system of claim 12 wherein said bis-unsaturated co-monomer is selected from the group consisting of diallylphthalate, 2,2'-diallylbisphenol A, and 2,2'-dipropenylbisphenol A.

14. The resin system of claim 10 wherein said diamine co-monomer is selected from the group consisting of cyclohexanediamine, hexanediamine, phenylenediamine, toluenediamine, diaminodiphenylmethane, xylyleediamine, isophoronediamine, dodecanediamine, diaminodiphenylsulfone and diaminodiphenyloxide, and wherein said unsaturated co-monomer is a bis-unsaturated co-monomer selected from the group consisting of diallylphthalate, 2,2'-diallylbisphenol A, and 2,2'-dipropenylbisphenol A.

15. The resin system of claim 14 wherein said maleimide comprises a mixture of the bis-maleimides of dodecanediamine and diaminodiphenylmethane.

16. The resin system of claim 14 wherein said maleimide comprises a mixture of the bis-maleimides of dodecanediamine and diaminodiphenylmethane and the reaction products of these bis-maleimides with diaminodiphenylmethane.

* * * * *